W. H. STEGLICH.
PEDAL LOCK.
APPLICATION FILED JULY 18, 1916.

1,205,577.

Patented Nov. 21, 1916.

WITNESSES:
B. R. Abbott
Lincoln Johnson

INVENTOR
William H. Steglich
BY Strong & Townsend
ATTORNEYS

UNITED STATES PATENT OFFICE.

WILLIAM H. STEGLICH, OF KING CITY, CALIFORNIA.

PEDAL-LOCK.

1,205,577.  Specification of Letters Patent.  Patented Nov. 21, 1916.

Application filed July 18, 1916. Serial No. 109,889.

*To all whom it may concern:*

Be it known that I, WILLIAM H. STEGLICH, a citizen of the United States, residing at King City, in the county of Monterey and State of California, have invented new and useful Improvements in Pedal-Locks, of which the following is a specification.

This invention relates to a pedal lock.

The object of the present invention is to provide a novel form of pedal control for automobiles and like vehicles and particularly a pawl and ratchet attachment whereby a pedal may be set or held until released by the operator.

The invention further consists of the parts and the construction and combination of parts as hereinafter more fully described and claimed, having reference to the accompanying drawings in which—

Figure 1:
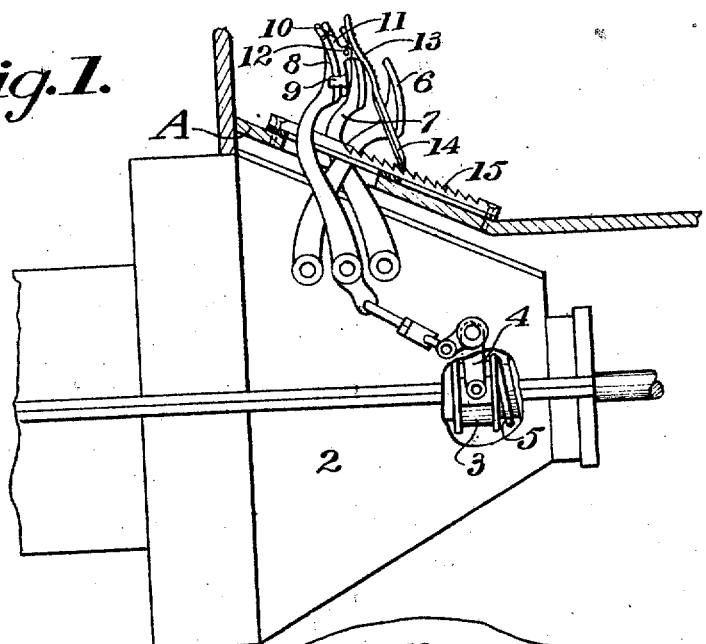
Figure 2:
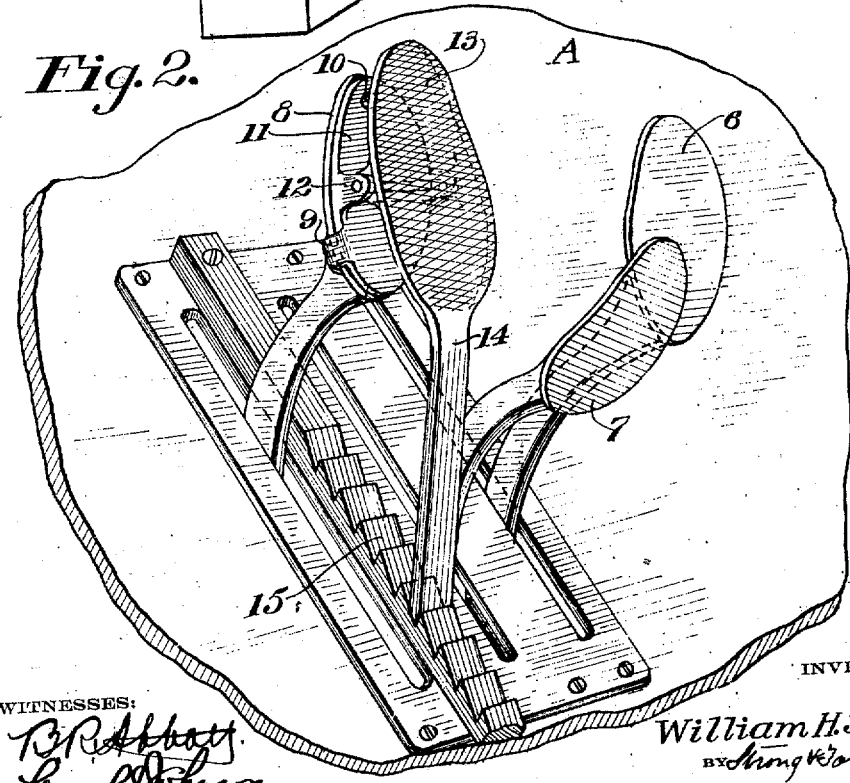

Figure 1 is a side elevation partly broken away, of the clutch and gear case of a Ford car, together with the operating pedals, showing the application of the invention. Fig. 2 is a perspective view of the foot board, showing the operating pedals projecting therethrough and the pedal locking mechanism applied.

The invention illustrated in the present instance is shown as applied to a Ford car, is which—

A indicates the foot board, 2 the clutch and gear case, 3 the clutch collar, 4 the forked arm by which it is operated, 5 the spring which normally holds the clutch in engagement, 6 the brake pedal, 7 the reverse pedal and 8 the clutch pedal. Secured to the face of the clutch pedal by means of a pair of lugs 9 and a screw 10 is a plate 11 and pivotally mounted between a pair of upwardly turned lugs 12 formed on the plate, is a foot plate 13 on the lower end of which is formed a pawl extension 14. This pawl extension is slightly offset and its lower end is sufficiently extended to permit it to engage with a rack bar 15, secured to the foot board on one side of the clutch pedal.

It is well known that the crank shaft of an automobile engine is generally connected with the transmission gears and the rear driving shaft by means of a spring actuated transmission clutch. This clutch is necessarily disengaged whenever it is desired to change the engagement of the gears or when it is desired to stop the car or allow the engine to run without transmitting power. This is particularly true of a Ford car. For instance, if it is desired to use the brake pedal 6, it is first necessary to move the clutch pedal 8 to neutral position. It is furthermore necessary to hold the clutch pedal in this position while the brake pedal is being used. The neutral position of the clutch pedal is secured more or less by guess work and unless an absolute neutral position is obtained, one of two things is liable to occur. Either the clutch disks will have a tendency to drag or more or less pressure will be applied to the low speed band when the car is coasting or the gear is thrown into reverse. It is furthermore necessary when coasting down a long hill, to constantly keep the foot upon the clutch pedal to hold it in neutral position while the brake is being applied, and it is also necessary to maintain the foot on the clutch pedal when this is pressed forward to bring the low gears into mesh, this being tiresome or tedious, particularly where lots of hill climbing is necessary. The provision of the pawl and ratchet mechanism here shown, eliminates the necessity of constantly maintaining the foot on the clutch pedal. For instance, if coasting down a hill it is only necessary to move the clutch pedal forward until the operator is positive that an absolute neutral position is obtained. The clutch pedal may then be set by rocking the foot plate 13 on its pivot until the pawl 14 engages with the rack. The foot may now be removed and the only attention required will be the operation of the brake pedal. Again, if the car is climbing a long grade and the clutch pedal is thrown into the lower gear, it may be similarly locked and set by again depressing the pawl 14 into position where it will engage with the rack bar. It can therefore be seen that the car can be more easily or readily handled as the clutch pedal when moved into a predetermined position, may be set and locked against movement. Any dragging of clutch disks or accidental application of the low speed band is in this manner obviated and repairs such as replacement of the brake linings or adjustments thereof, are consequently to a large extent reduced.

The materials and finish of the several parts of the invention may be such as the judgment and experience of the manufacturer may dictate.

I wish it understood that various changes in form, proportions and minor details of construction may be resorted to within the scope of the appended claim, and that I do not wish to limit myself to the specific design and construction here shown.

Having thus described my invention, what I claim and desire to secure by Letters Patent is—

The combination with the clutch actuating pedal of an automobile, of a supplemental pedal plate having side clips adapted to grip the main pedal, and having upturned fulcrum lugs, a second pedal plate superposed above said plate, having down-turned lugs tiltably engaged with the fulcrum lugs, a pawl formed with and extending rearwardly from the tiltable plate, and to one side of the clutch lever, and a straight rack bar fixed in a line parallel to and at one side of the line of travel of the lever and engageable by the pawl.

In testimony whereof I have hereunto set my hand in the presence of two subscribing witnesses.

WILLIAM H. STEGLICH.

Witnesses:
OSCAR McGUIRE,
E. D. DILLON.